(12) United States Patent
Xu et al.

(10) Patent No.: US 10,664,392 B2
(45) Date of Patent: May 26, 2020

(54) METHOD AND DEVICE FOR MANAGING STORAGE SYSTEM

(71) Applicant: EMC IP Holding Company LLC, Hopkinton, MA (US)

(72) Inventors: Xinlei Xu, Beijing (CN); Jian Gao, Beijing (CN); Lifeng Yang, Beijing (CN); Yousheng Liu, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 103 days.

(21) Appl. No.: 15/848,418

(22) Filed: Dec. 20, 2017

(65) Prior Publication Data

US 2019/0095325 A1   Mar. 28, 2019

(30) Foreign Application Priority Data

Dec. 21, 2016   (CN) .......................... 2016 1 1194058

(51) Int. Cl.
*G06F 11/00* (2006.01)
*G06F 12/06* (2006.01)
*G06F 11/10* (2006.01)

(52) U.S. Cl.
CPC ...... *G06F 12/0646* (2013.01); *G06F 11/1076* (2013.01); *G06F 2212/1032* (2013.01); *G06F 2212/1044* (2013.01); *G06F 2212/262* (2013.01)

(58) Field of Classification Search
CPC .............. G06F 11/1076; G06F 11/108; G06F 11/1096; G06F 12/0646
See application file for complete search history.

(56) References Cited

U.S. PATENT DOCUMENTS

| | | | | |
|---|---|---|---|---|
| 6,571,351 | B1* | 5/2003 | Mitaru | G06F 11/1076 711/163 |
| 7,424,574 | B1* | 9/2008 | Ahrens | G06F 3/061 711/114 |
| 2013/0003211 | A1* | 1/2013 | Kawaguchi | G06F 11/1092 360/39 |
| 2013/0262920 | A1* | 10/2013 | Jung | G06F 11/1076 714/6.22 |
| 2016/0196216 | A1* | 7/2016 | Lee | G06F 3/0604 711/170 |

\* cited by examiner

*Primary Examiner* — Joshua P Lottich
(74) *Attorney, Agent, or Firm* — Brian J. Colandreo; Mark H. Whittenberger; Holland & Knight LLP

(57) ABSTRACT

The present invention discloses a method and device for managing a storage system. Specifically, in one embodiment of the present invention there is proposes a method for managing a storage system, the method comprising: dividing a stripe included in a storage array in the storage system into a group of blocks; in response to receiving an allocation request for a storage space in the storage system, determining a space size associated with the allocation request; and building a repository based on one or more blocks selected from the group which match the space size, the repository being defined using an address mapping including addresses of the one or more blocks in the storage system. In one embodiment of the present invention there is proposed a device for managing a storage system.

20 Claims, 15 Drawing Sheets

Repository comprises: blocks 312, 314, ..., 316

Block to be recovered    Block does not need to be recovered

METHOD AND DEVICE FOR MANAGING STORAGE SYSTEM

RELATED APPLICATIONS

This application claim priority from Chinese Patent Application Number CN201611194058.X, filed on Dec. 21, 2016 at the State Intellectual Property Office, China, titled "METHOD AND APPARATUS FOR MANAGING STORAGE SYSTEM" the contents of which is herein incorporated by reference in its entirety.

FIELD

Various embodiments of the present invention relate to storage management, and more specifically, to a method and system for managing a storage system (e.g. Redundant Array of Independent Disks, RAID).

BACKGROUND

With the development of data storage techniques, various data storage devices now provide users with higher data storage capacity, and also their speed of accessing data has been increased greatly. So far various RAID-based data storage systems have been developed to increase data reliability. When one or more disks in a storage system fail, a new backup disk needs to be introduced to the storage system, data in failed disks can be recovered from data in other disks operating normally.

The storage system may allocate storage spaces in corresponding sizes according to requests of different users. For example, the storage system may indicate the allocated storage space in the form of Logic Unit Number (LUN). However, since the allocated storage space is defined in light of the requested size, once a corresponding storage space is allocated for a user, the size of the space is fixed and cannot be adjusted during use as the user demands.

SUMMARY

Therefore, it is desirable to develop and implement a technical solution for managing a storage system and improving performance of the storage system. It is desired that the technical solution can be compatible with existing storage systems and manage existing storage systems more effectively without any extra hardware devices added to them.

In one embodiment of the present invention, there is provided a method for managing a storage system. The method comprises: dividing a stripe included in a storage array in the storage system into a group of blocks; in response to receiving an allocation request for a storage space in the storage system, determining a space size associated with the allocation request; and building a repository based on one or more blocks selected from the group which match the space size, where the repository is defined using an address mapping including addresses of the one or more blocks in the storage system.

In one embodiment of the present invention, there is provided a device for managing a storage system, comprising: a dividing module configured to divide a stripe included in a storage array in the storage system into a group of blocks; a determining module configured to, in response to receiving an allocation request for a storage space in the storage system, determine a space size associated with the allocation request; and a building module configured to build a repository based on one or more blocks selected from the group which match the space size, where the repository is defined using an address mapping including addresses of the one or more blocks in the storage system.

In one embodiment of the present invention, there is provided a device for managing a storage system, comprising: one or more processors; a memory coupled to at least one processor of the one or more processors; computer program instructions stored in the memory which, when executed by the at least one processor, cause the device to execute a method for managing a storage system. The method comprises: dividing a stripe included in a storage array in the storage system into a group of blocks; in response to receiving an allocation request for a storage space in the storage system, determining a space size associated with the allocation request; and building a repository based on one or more blocks selected from the group which match the space size, where the repository is defined using an address mapping including addresses of the one or more blocks in the storage system.

With the technical solution of the present invention, a storage system can be managed in a more convenient manner, and further response efficiency and reliability of the storage system may be improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
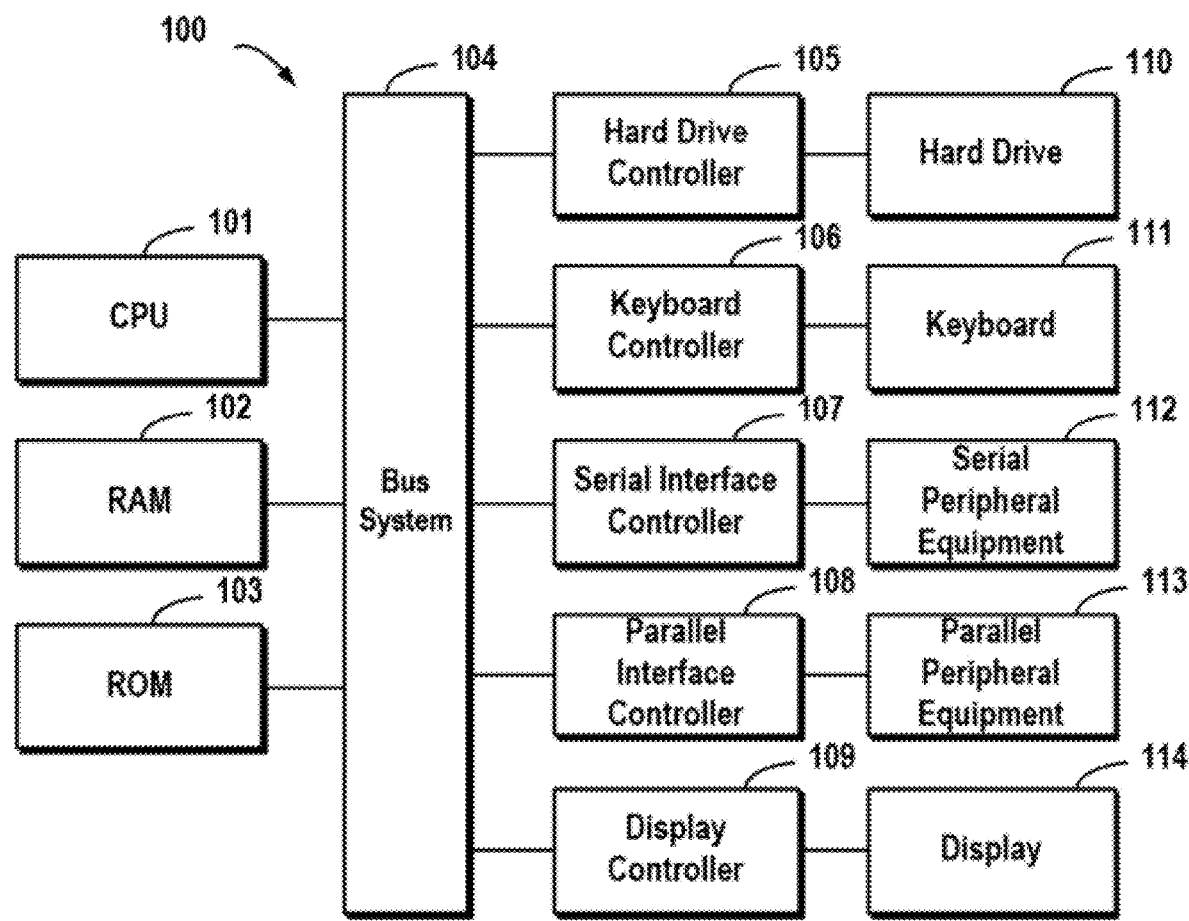
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those skilled in the art should understand that illustrated above is just a typical example of an application environment where the various embodiments of the present invention can be implemented. Throughout the context of the present invention, the various embodiments of the present invention may be implemented in various application environments that are known already or to be developed later.

In a storage system such as Redundant Array of Independent Disks (RAID), multiple storage devices (e.g., disks) may be combined into an array of disks. By providing redundant storage devices, the reliability of an entire disk group is caused to significantly exceed that of a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc.

For more details about RAID levels, those skilled in the art may refer to https://en.wikipedia.org/wiki/Standard_RAID_levels and https://en.wikipedia.org/wiki/Nested_RAID_levels, etc. The operating system may consider a disk array, consisting of multiple storage devices, as a single logical storage unit or disk. By partitioning the disk array into multiple stripes, data may be distributed across multiple storage devices, so that low delay and high bandwidth are achieved, and data can be recovered to some extent when some disks are broken.

Figure 2A:
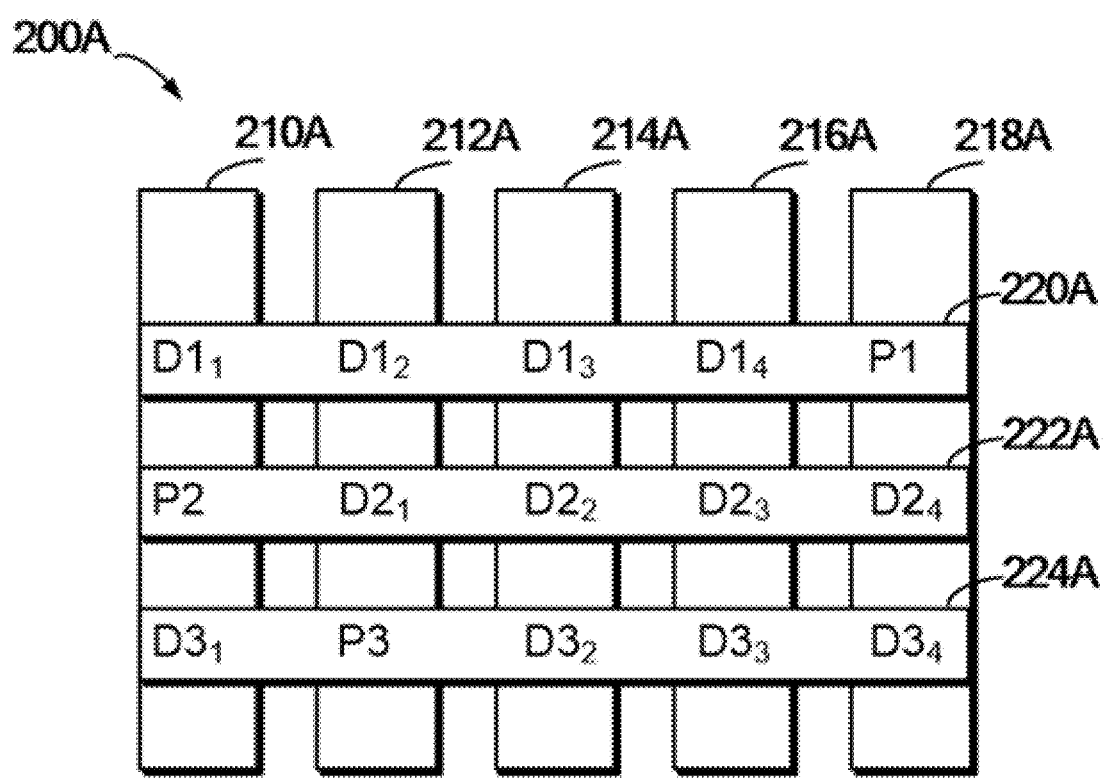
FIG. 2A schematically illustrates a structural view of a Redundant Array of Independent Disks according to one technical solution, and FIG. 2B schematically illustrates a schematic view of rebuilding process of a Redundant Array of Independent Disks according to one technical solution.

FIG. 2A schematically illustrates a structural view 200A of RAID according to one technical solution. In this figure, working principles of RAID are illustrated by taking RAID-5 that consists of five independent storage devices (210A, 212A, 214A, 216A and 218A) as an example. It should be noted although FIG. 2A depicts five storage devices, in other embodiments more or less storage devices may be provided according to different versions of RAID. Moreover, although FIG. 2A depicts stripes 220A, 222A and 224A, in other examples a RAID system may further comprise different numbers of stripes.

In RAID, a stripe crosses multiple physical storage devices (for example, the stripe 220A crosses the storage devices 210A, 212A, 214A, 216A and 218A). The stripe may be simply construed as a storage area among multiple storage devices which satisfies a given address range. Data stored in the stripe 220 comprises multiple parts: a data block $D1_1$ stored in the storage device 210A, a data block $D1_2$ stored in the storage device 212A, a data block $D1_3$ stored in the storage device 214A, a data block $D1_4$ stored in the storage device 216A, and a data block P1 stored in the storage device 218A. In this example, data blocks $D1_1$, $D1_2$, $D1_3$ and $D1_4$ are stored data, and data block P1 is a parity of the stored data.

The mode of storing data in other stripes is similar to that in the stripe 220A, and the difference is that the parity about other data block may be stored in other storage device than the storage device 218A. In this way, when one of the multiple storage devices 210A, 212A, 214A, 216A and 218A is failed, data in the failed device may be recovered from other normal storage devices.

Figure 2B:
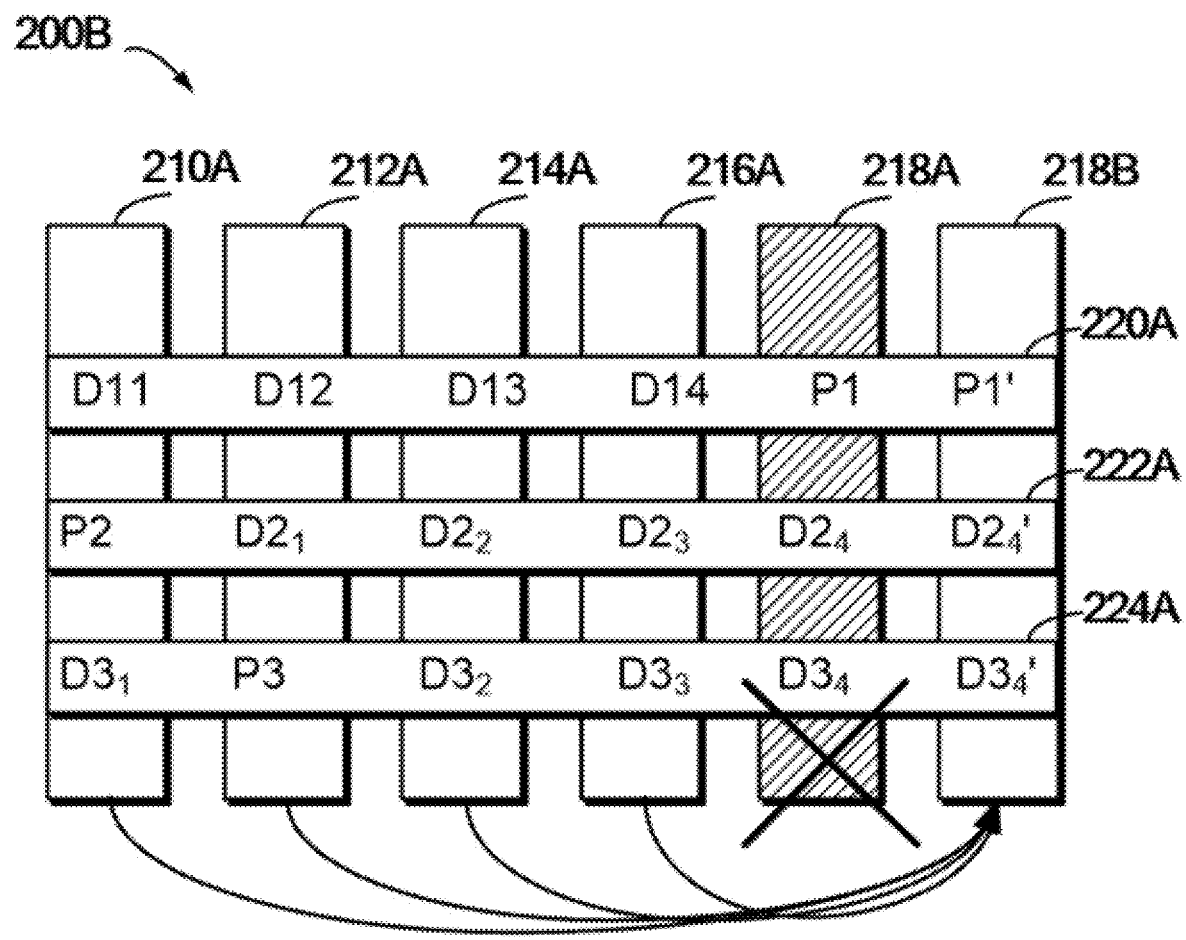

FIG. 2B schematically illustrates a schematic view 200B of rebuilding process of RAID according to one technical solution. As shown in FIG. 2B, when one storage device (e.g. the storage device 218A shown in shadow) is failed, data may be recovered from the other storage devices 210A, 212A, 214A and 216A that operate normally. At this point, a new backup storage device 218B may be added to RAID to replace the storage device 218A. In this way, recovered data may be written to the storage device 218B, and system rebuilding may be realized. Although the system shown in FIGS. 2A and 2B uses one storage device to store P parity (R5 RAID), an R6 RAID system two storage devices may be used to store P parity and Q parity respectively.

Note in the existing RAID storage system a storage space may be allocated for a user based on a stripe across multiple storage devices. Suppose one stripe comprises a 1G storage space and the user requests an allocation of a 1G storage space, then at this point a stripe (e.g., the stripe 220A as shown in FIG. 2) in the storage system may be allocated for the user and identified as a LUN. Note here it is not intended to limit a size of the stripe, but the size of the stripe may be set to different values as a concrete application environment demands.

When the user realizes the 1 G storage space is insufficient and desires to request an extra 500M storage space from the storage system, the existing storage system fails to satisfy the user's demand. Instead, a 1.5 G space needs to be allocated in the storage system, and data in the existing 1 G space needs to migrate to the new storage space. In view of inconvenience in the existing storage system, it is desirable to develop a technical solution that is capable of managing a storage system more flexibly.

In view of the foregoing drawbacks in the prior art, the present invention proposes a method for managing a storage system. The method comprises: dividing a stripe included in a storage array in the storage system into a group of blocks; in response to receiving an allocation request for a storage space in the storage system, determining a space size associated with the allocation request; and building a repository based on one or more blocks selected from the group which match the space size, here the repository is defined using an address mapping including address(es) of the one or more blocks in the storage system.

Figure 3A:
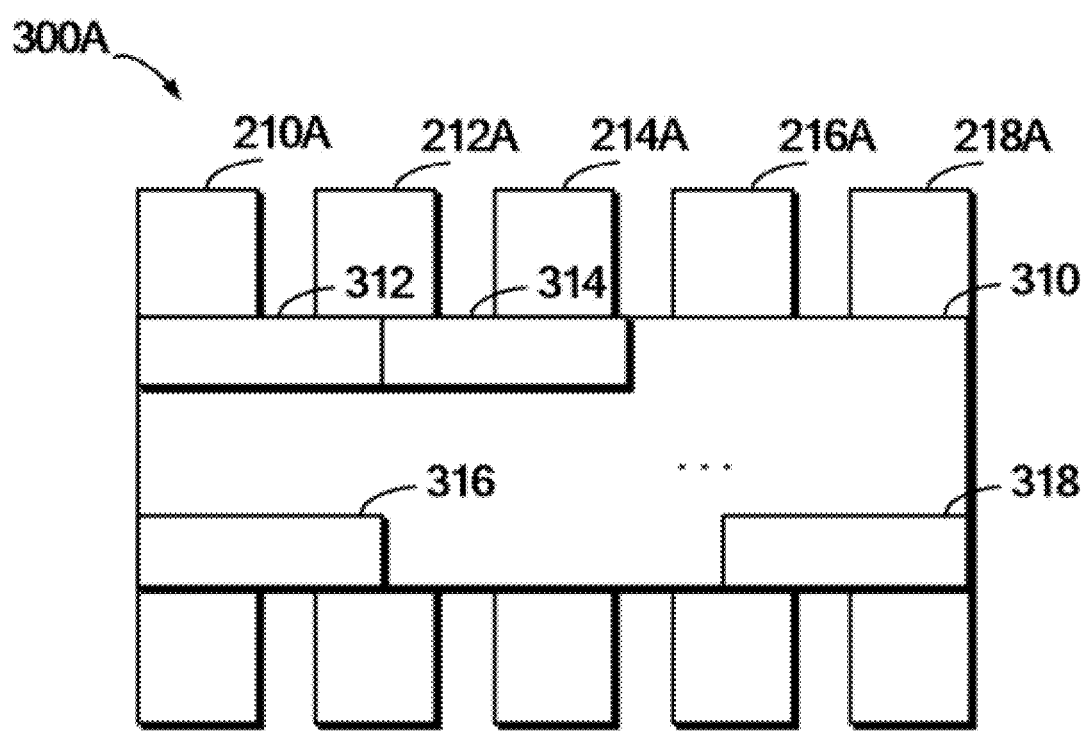
FIG. 3A schematically illustrates an architecture view of a technical solution for managing a storage system according to one embodiment of the present invention, and FIG. 3B schematically illustrates a block diagram of a repository built according to one embodiment of the present invention.
Figure 3B:
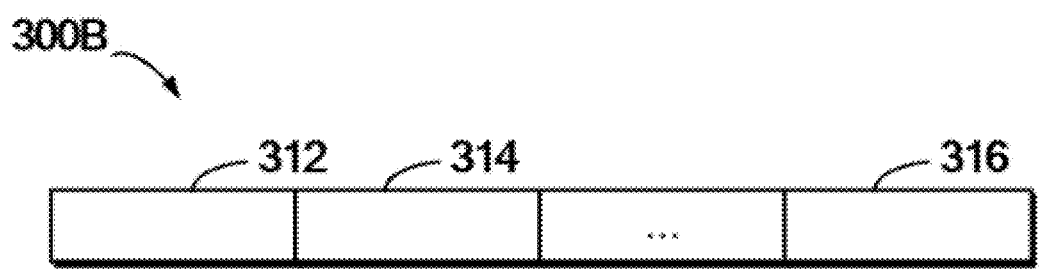

An outline of the various embodiments of the present invention will be introduced with reference to FIGS. 3A and 3B. FIG. 3A schematically illustrates an architecture view 300A of a technical solution for managing a storage system according to one embodiment of the present invention. As shown in this figure, a stripe 310 is a stripe across the multiple storage devices 210A, 212A, 214A, 216A and 218A in the storage system.

Unlike a conventional technical solution, in one embodiment of the present invention, the stripe 310 may be divided into a plurality of blocks 312, 314, . . . , 316, . . . , 318. Note although the blocks 312 and 314 are shown as consecutive blocks in FIG. 3A, in an actual physical storage, each of the blocks 312 and 314 is stored across the storage devices 210A, 212A, 214A, 216A and 218A. In this embodiment, the block may be regarded as a finer-granular stripe. Suppose the stripe 310 has a 1 G storage space, the block here may be a storage unit with a smaller storage space. For example, the 1 G storage space may be divided into 10 blocks, at which point the size of each block is 100M. In this embodiment, the address of each block in the storage system may be recorded; for example, addresses of various blocks as shown in FIG. 3A may be stored in a data structure as shown in Table 1.

TABLE 1

Address Mapping

| Block Identifier | Address |
|---|---|
| Block 312 | ADDRESS1 |
| Block 314 | ADDRESS2 |
| ... | ... |
| Block 316 | ADDRESS3 |
| ... | ... |
| Block 318 | ADDRESS4 |

FIG. 3B schematically illustrates a block diagram of a repository 300B built according to one embodiment of the present invention. In this embodiment, a repository 300B may be returned to the user, and the repository 300B may comprise block 312, 314, ..., 316. The size of the repository 300B satisfies the space size in the received allocation request. Specifically, the repository 300B may be defined using an address mapping including address(es) of the one or more blocks in the storage system. For example, addresses of various blocks in the repository 300B as shown in FIG. 3B may be stored in a data structure as shown in Table 2.

TABLE 2

Address Mapping for Repository

| Block Identifier | Address |
|---|---|
| Block 312 | ADDRESS1 |
| Block 314 | ADDRESS2 |
| ... | ... |
| Block 316 | ADDRESS3 |

Figure 4:
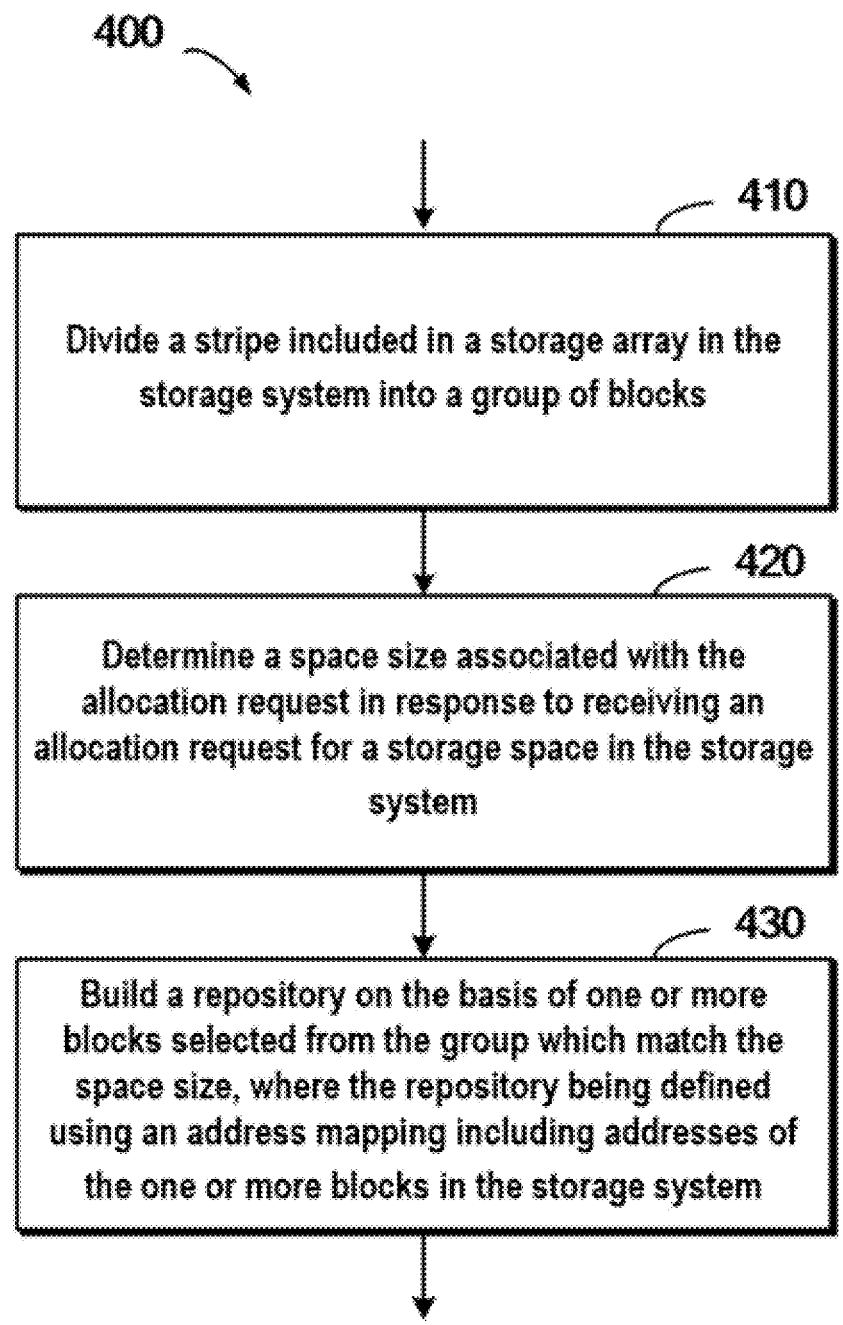
FIG. 4 schematically illustrates a flowchart of a method for managing a storage system according to one embodiment of the present invention.

FIG. 4 schematically illustrates a flowchart 400 of a method for managing a storage system according to one embodiment of the present invention. In step 410, a stripe included in a storage array in the storage system is divided into a group of blocks. In this step, the stripe may be divided into blocks in corresponding sizes according to a predefined rule. In addition, the embodiments of the present invention do not limit the number of stripes included in the storage array in the storage system, but one storage array may comprise one or more stripes.

In step 420, in response to receiving an allocation request for a storage space in the storage system, a space size associated with the allocation request is determined. In this step, the space size as requested may be parsed from the allocation request. Alternatively, the space size may further be acquired using other approach.

In step 430, a repository is built based on one or more blocks selected from the group which match the space size, here the repository is defined using an address mapping including address(es) of the one or more blocks in the storage system. In this step, a storage space in the repository may be indicated using the data structure as shown in Table 2 above. Subsequently, the user may access the repository based on an address as shown in Table 2.

Figure 5A:
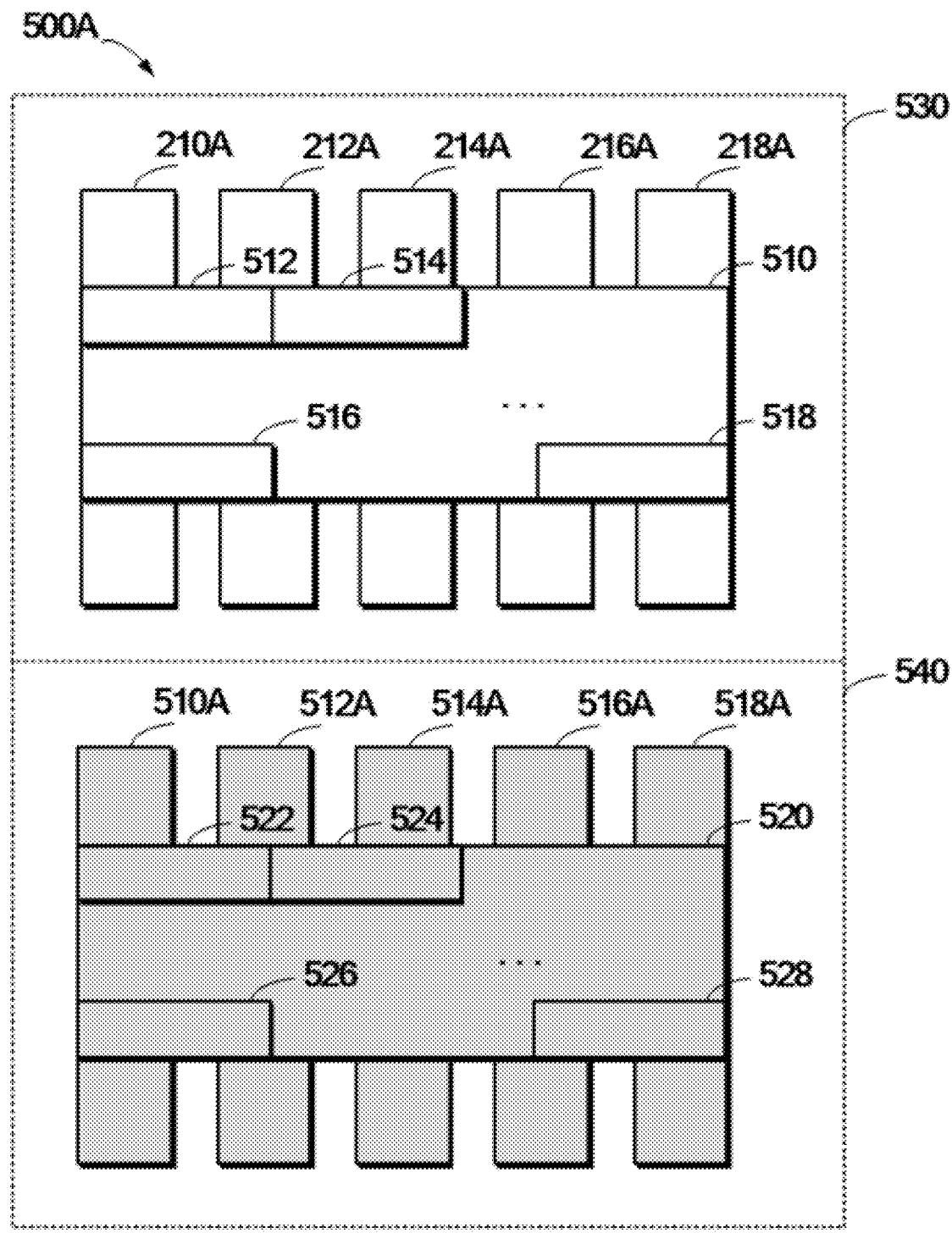
FIG. 5A schematically illustrates an architecture view of a technical solution for managing a storage system according to one embodiment of the present invention, and FIG. 5B schematically illustrates a block diagram of a repository built according to one embodiment of the present invention.
Figure 5B:
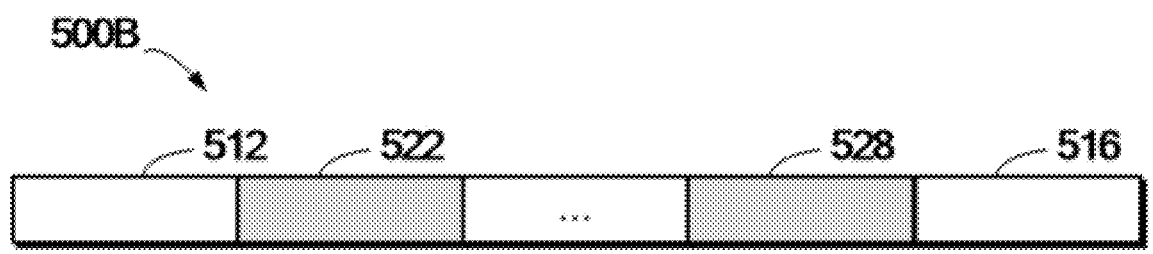

In one embodiment of the present invention, the storage system further comprises a second storage array, and the method further comprises: dividing a stripe in the second storage array into a second group of blocks; and adding the second group of blocks to the group. Note the embodiments of the present invention do not limit the number of storage arrays included in the storage system. Instead, the storage system may comprise one or more storage arrays. FIGS. 5A and 5B each show a circumstance where a storage system comprises multiple storage arrays.

Specifically, FIG. 5A schematically illustrates an architecture view of a technical solution for managing a storage system according to one embodiment of the present invention. In FIG. 5A, a storage system 500A comprises storage arrays 530 and 540. Among them, the storage array 530 comprises the storage devices 210A, 212A, 214A, 216A and 218A, a stripe 510 crosses multiple storage devices, and the stripe 510 is divided into blocks 512, 514, 516, ..., 518. In addition, the storage array 540 (shown in gray) comprises storage devices 510A, 512A, 514A, 516A and 518A, a stripe 520 crosses multiple storage devices, and the stripe 520 is divided into blocks 522, 524, 526, ..., 528.

In this embodiment, in response to the allocation request from the user, a repository may be built based on blocks from the different storage arrays 530 and 540. FIG. 5B schematically illustrates a block diagram of a repository 500B built according to one embodiment of the present invention. In this embodiment, the repository may comprise the blocks 512 and 516 from the storage array 530, and the blocks 522 and 528 from the storage array 540. Specifically, the repository 500B may be defined using a data structure as shown in Table 3.

TABLE 3

Address Mapping for Repository

| Block Identifier | Address |
|---|---|
| Block 512 | ADDRESS5 |
| Block 522 | ADDRESS6 |
| ... | ... |
| Block 528 | ADDRESS7 |
| Block 516 | ADDRESS8 |

Further note although the stripes 510 and 520 shown in FIG. 5A come from different storage arrays, in another embodiment the stripes 510 and 520 may be in the same storage array. At this point, the storage array may comprise a second storage array, and the method further comprises: dividing a stripe in the second storage array into a second group of blocks; and adding the second group of blocks to the group. In this embodiment, multiple blocks from multiple stripes may jointly form a pool, and the pool may comprise a storage space for responding to the allocation request from the user.

In one embodiment of the present invention, the allocation request may further comprise a priority, and a high priority indicates the user desires to obtain higher input/output (IO) performance (for example, blocks in the repository may be distributed over multiple storage arrays as far as possible), while a low priority indicates the user only needs ordinary IO performance (for example, blocks in the repository may be distributed over a single storage array as far as possible).

In one embodiment of the present invention, the building a repository based on one or more blocks selected from the group which match the space size comprises: selecting the one or more blocks from the group, such that the one or more blocks are uniformly distributed over the storage array and the second storage array. In this embodiment, by uniformly selecting blocks from multiple storage arrays, uniform access to storage devices in the multiple storage arrays can be ensured, so that it may be avoided that IO access to one storage array in the storage system reaches a high load while the other storage array remains in idle state.

In the example as shown in FIGS. 5A and 5B, suppose the user requests a space size that is as big as 10 blocks, then 5 blocks may be selected from the storage array 530 and 5 blocks may be selected from the storage array 540, so that the two storage arrays 530 and 540 are accessed uniformly.

In one embodiment of the present invention, the address mapping may be stored to a Dynamic Random Access Memory (DRAM) cache in the storage system. On the one hand, since DRAM is a persistent storage device, when the storage system faces a power-down or undergoes other failures, the address mapping may not be destroyed. On the other hand, the DRAM cache learns IO flow control information in the storage system, so DRAM may more effectively guarantee a balance of work load between various storage arrays in the storage system when allocating blocks for the user. In addition, DRAM may learn status of each block (e.g., whether a block is allocated for the user, and whether a block is used by the user), and status information may be used in the rebuild process where the storage system is failed.

Figure 6A:
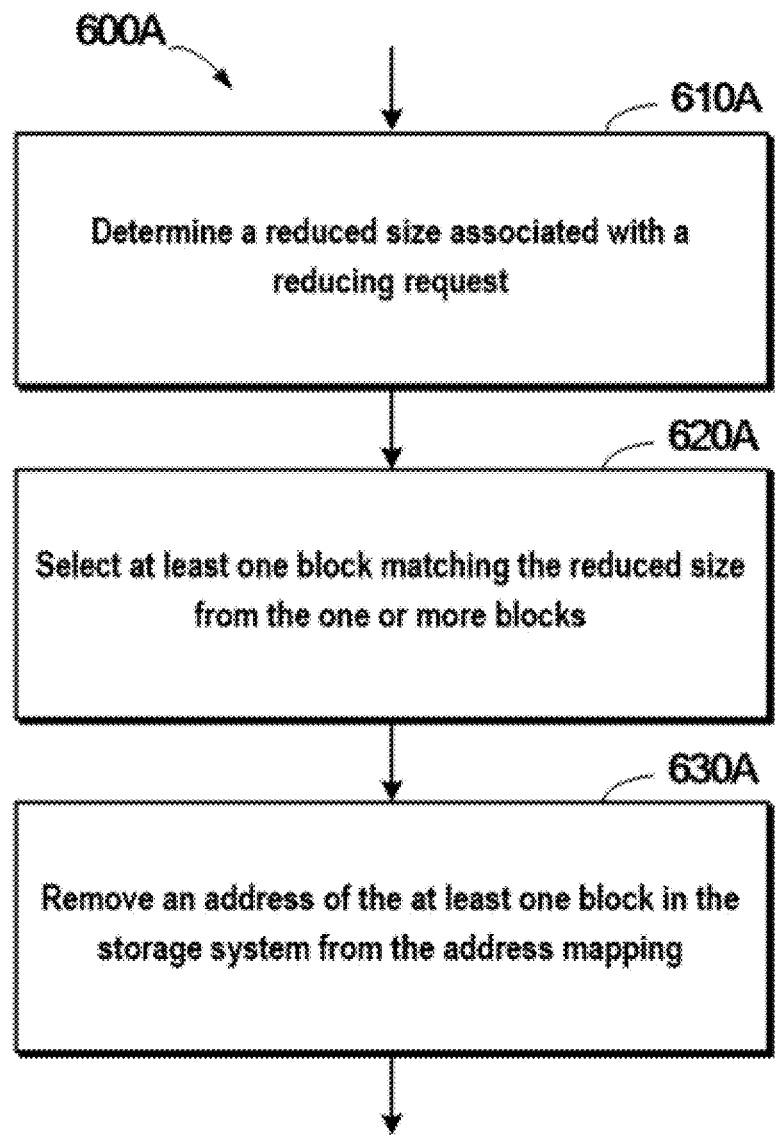
FIG. 6A schematically illustrates a flowchart of a method executed in response to a reducing request according to one embodiment of the present invention, and FIG. 6B schematically illustrates a block diagram of a reduced repository according to one embodiment of the present invention.

FIG. 6A schematically illustrates a flowchart 600A of a method executed in response to a reducing request according to one embodiment of the present invention. As shown in FIG. 6A, in response to receiving a reducing request for reducing a size of the repository, a reduced size associated with the reducing request is determined in step 610A. In step 620A, at least one block matching the reduced size is selected from the one or more blocks. In step 630A, an address of the at least one block in the storage system is removed from the address mapping.

Figure 6B:
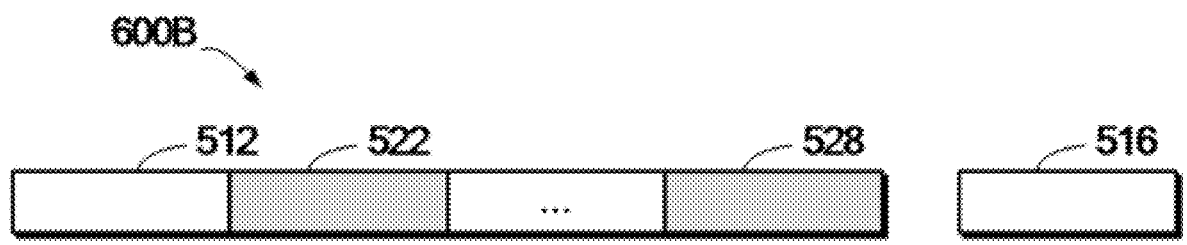

FIG. 6B schematically illustrates a block diagram 600B of a repository reduced according to one embodiment of the present invention. Continuing the example shown in FIG. 5B, suppose a reducing request (e.g., requesting to reduce 1 block) with respect to the repository as shown in FIG. 5B is received, then the block 516 at the end of the repository is selected and removed from the repository. Continuing the example in Table 3, the reduced repository may be represented as Table 4 below.

TABLE 4

Address Mapping for Repository

| Block Identifier | Address |
| --- | --- |
| Block 512 | ADDRESS5 |
| Block 522 | ADDRESS6 |
| ... | ... |
| Block 528 | ADDRESS7 |

In one embodiment of the present invention, in response to a target block in the at least one block being loaded to at least one target page in a buffer device in the storage system, the at least one target page is released. Note the storage system may be provided with a multilevel storage structure consisting of the DRAM cache, a buffer device and a storage device. When data in a block is frequently used, the block may be loaded to the buffer device so as to improve data access efficiency. In this embodiment, if it is found a target block has been loaded to a target page in the buffer device, then the target page may be released. Specifically, status of the target page may be marked as "available."

In one embodiment of the present invention, in response to receiving an expansion request for expanding a size of the repository, an expanded size associated with the expansion request is determined; and the address mapping is updated based on an address of at least one block in the storage system, here the at least one block is selected from the group and matches the expanded size.

Figure 7A:
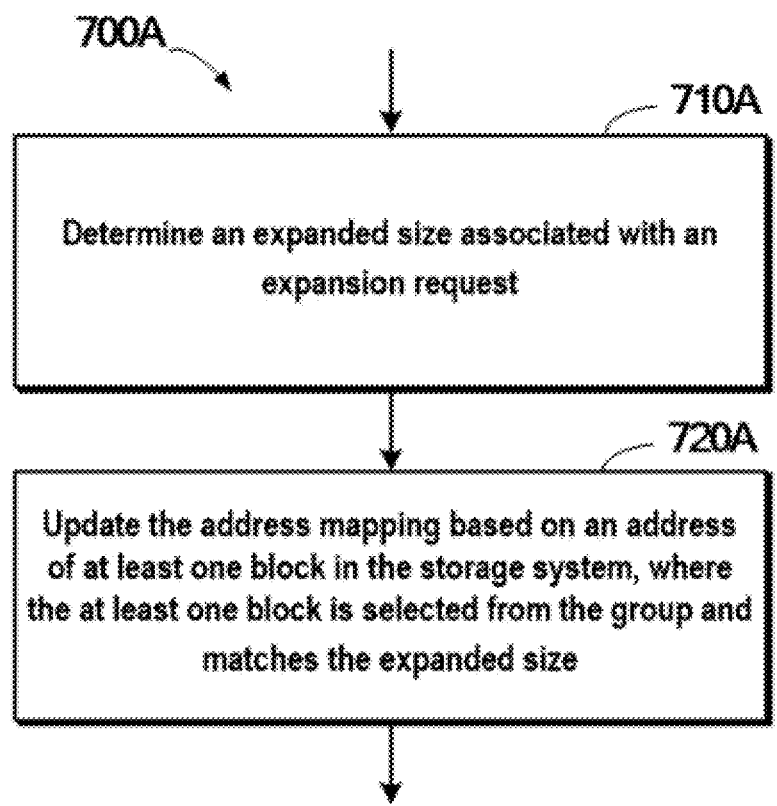
FIG. 7A schematically illustrates a flowchart of a method executed in response to an expansion request according to one embodiment of the present invention, and FIG. 7B schematically illustrates a block diagram of an expanded repository according to one embodiment of the present invention.

FIG. 7A schematically illustrates a flowchart 700A of a method executed in response to an expansion request according to one embodiment of the present invention. In step 710A, in response to receiving an expansion request for expanding a size of the repository, an expanded size associated with the expansion request is determined. For example, a space size the user desires to increase may be extracted from the expansion request directly. In step 720A, the address mapping is updated based on an address of at least one block in the storage system, here the at least one block is selected from the group and matches the expanded size.

Figure 7B:
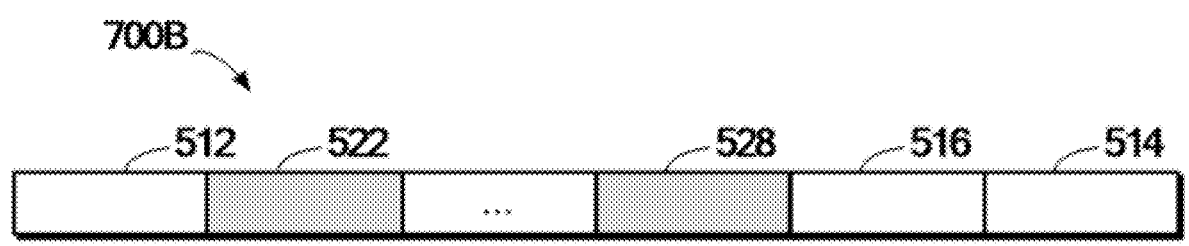

FIG. 7B schematically illustrates a block diagram 700B of a repository expanded according to one embodiment of the present invention. Continuing the example shown in FIG. 5B, suppose an expansion request (e.g., requesting to expand 1 block) with respect to the repository as shown in FIG. 5B is received, then another block 514 may be added after the block 516 at the end of the repository. Continuing the example in Table 3, a repository resulting from expanding the repository in Table 3 may be represented as Table 5 below.

TABLE 5

Address Mapping for Repository

| Block Identifier | Address |
| --- | --- |
| Block 512 | ADDRESS5 |
| Block 522 | ADDRESS6 |
| ... | ... |
| Block 528 | ADDRESS7 |
| Block 516 | ADDRESS8 |
| Block 514 | ADDRESS9 |

In the running process of the storage system, a storage device in the storage array might be failed, and afterwards a rebuild process will be started. During the data rebuild, data in the failed storage device needs to be recovered from a normal storage device. When the storage device includes a large storage space, the time for data recovery might amount to several hours and even a couple of days. As the storage capacity of the storage system increases constantly, the time for data recovery might become unbearable. The embodiments of the present invention further propose a technical solution that is capable of improving rebuild efficiency of a storage system.

In one embodiment of the present invention, in response to a storage device in the storage array being failed, a backup storage device is added to the storage array; and data is recovered from a normal storage device in the storage array to the backup storage device based on the address mapping. In this embodiment, it may be further determined using the address mapping which blocks in the storage array have been allocated for the user. Further, only data in allocated blocks may be recovered, while data in blocks which have not been allocated for the user does not need to be recovered.

In one embodiment of the present invention, the recovering data from a normal storage device in the storage array to the backup storage device comprises: determining an address range of a target block of the one or more blocks in the storage system based on address mapping; and recovering data within the address range from a normal storage device in the storage array to the backup storage device.

Figure 8A:
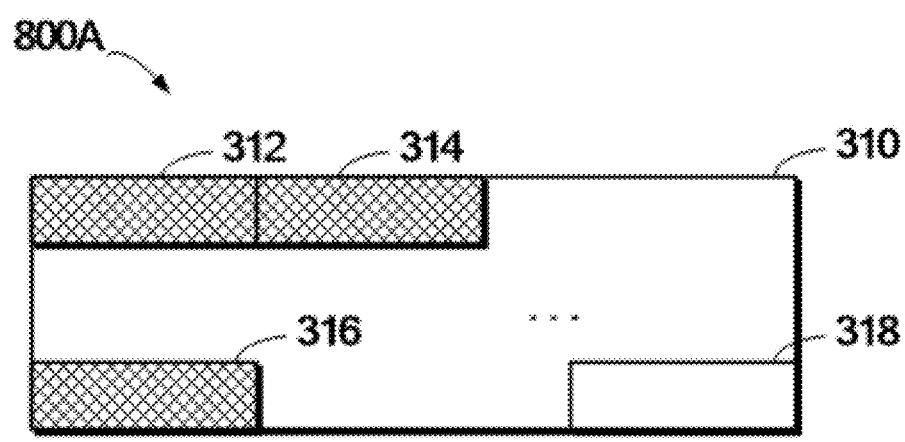
FIGS. 8A and 8B schematically illustrates a block diagram of recovering data from a failed storage array according to one embodiment of the present invention, respectively.
Figure 8A:
Figure 8A:

FIG. 8A schematically illustrates a block diagram 800A for recovering data from a failed storage array according to one embodiment of the present invention. FIG. 8A depicts a block diagram for recovering data from the repository in FIG. 3B. According to the definition in Table 2, the repository allocated for the user comprises the blocks 312, 314, . . . , 316, at which point only data (as shown by shaded parts in FIG. 8A) associated with the blocks 312, 314, . . . , 316 needs to be recovered. For a block (the block 318 shown in blank in FIG. 8A) in the storage system which has not been allocated, a recovery process is not needed.

In this embodiment, since the recovery process is performed only to allocated blocks, the amount of to-be-recovered data may be reduced significantly. In particular, where only a small part of storage space in the storage system has been allocated for the user, the efficiency of rebuild process may be greatly improved using the embodiment of the present invention.

In one embodiment of the present invention, in response to receiving a writing request with respect to the repository, data is written to an address range associated with the writing request based on the address mapping; and the address range is marked as "used." After a repository is provided to the user, a storage space in the repository will not be filled with data immediately, but is gradually filled with data as a writing request with respect to the repository is received. In this embodiment, initially the entire storage space of the repository may be marked as "unused," and as data is written, the address range to which data will be written is gradually marked as "used."

When a storage device in the storage array is failed, associated data may be recovered based on usage status "used/unused." Specifically, only data within an address range whose status is "used" may be recovered. In one embodiment of the present invention, the recovering data from a normal storage device in the storage array to the backup storage device based on the address mapping comprises: recovering data within an address range marked as "used" from a normal storage device in the storage array to the backup storage device.

Figure 8B:
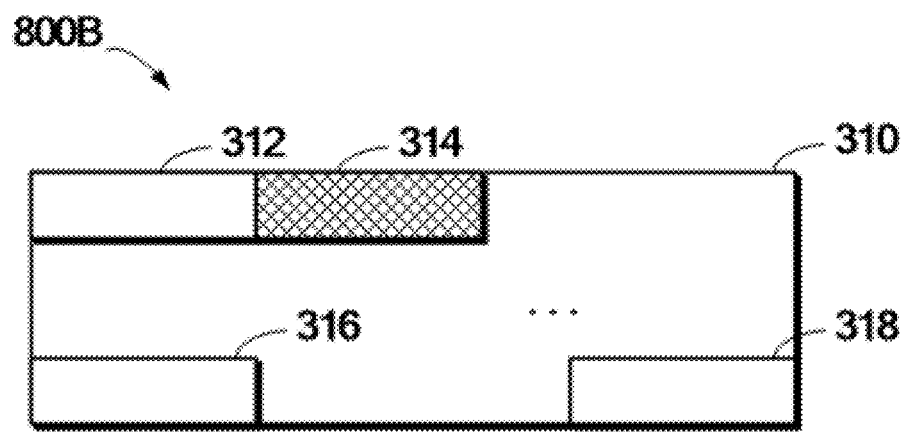

FIG. 8B schematically illustrates a block diagram 800B for recovering data from a failed storage array according to one embodiment of the present invention. FIG. 8B depicts a block diagram for recovering data in the repository in FIG. 3B. According to the definition in Table 2, the repository allocated for the user comprises the blocks 312, 314, . . . , 316, at which point only the block 314 (as shown by the shaded part in FIG. 8B) is used. However, only data in the block 314 needs to be recovered, while for blocks (the blocks 312, 316 and 318 shown in blank in FIG. 8B) in the storage system which have not been used, a recovery process is not needed.

The various embodiments implementing the method of the present invention have been described above with reference to the accompanying drawings. Those skilled in the art may understand the method may be implemented in software, hardware or a combination of software and hardware. Moreover, those skilled in the art may understand by implementing various steps in the above method in software, hardware or a combination of software and hardware, there may be provided a device based on the same invention concept. Even if the device has the same hardware structure as a general-purpose processing device, the functionality of software contained therein makes the device manifest distinguishing properties from the general-purpose processing device, thereby forming a device of the various embodiments of the present invention. The device described in the present invention comprises several means or modules, which are configured to execute corresponding steps. Upon reading this specification, those skilled in the art may understand how to write a program for implementing actions performed by these means or modules. Since the device is based on the same invention concept as the method, the same or corresponding implementation details are also applicable to means or modules corresponding to the method. As a detailed and complete description has been presented above, it might be ignored below.

Figure 9:
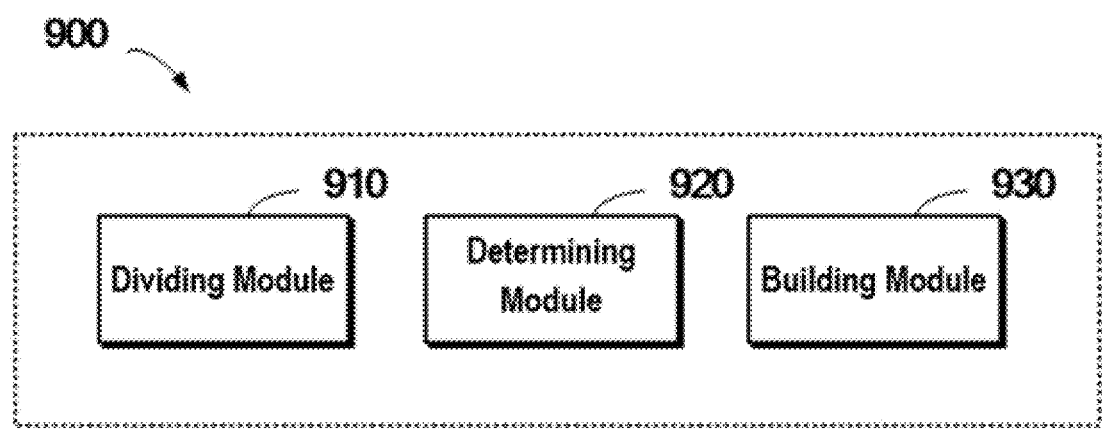
FIG. 9 schematically illustrates a block diagram of a device for managing a storage system according to one embodiment of the present invention.

FIG. 9 schematically illustrates a block diagram of a device 900 for managing a storage system according to one embodiment of the present invention. As shown in FIG. 9, there is provided a device for managing a storage system. The device 900 comprises: a dividing module 910 configured to divide a stripe included in a storage array in the storage system into a group of blocks; a determining module 920 configured to, in response to receiving an allocation request for a storage space in the storage system, determine a space size associated with the allocation request; and a building module 930 configured to build a repository based on one or more blocks selected from the group which match the space size, here the repository is defined using an address mapping including address(es) of the one or more blocks in the storage system.

In one embodiment of the present invention, the storage system further comprises a second storage array, and the dividing module 910 is further configured to: divide a stripe in the second storage array into a second group of blocks; and add the second group of blocks to the group.

In one embodiment of the present invention, the building module 930 is further configured to: select the one or more blocks from the group, such that the one or more blocks are uniformly distributed over the storage array and the second storage array.

In one embodiment of the present invention, the device further comprises a reducing module configured to, in response to receiving a reducing request for reducing a size of the repository, determine a reduced size associated with the reducing request; select at least one block matching the reduced size from the one or more blocks; and remove an address of the at least one block in the storage system from the address mapping.

In one embodiment of the present invention, the reducing module is further configured to: in response to a target block in the at least one block being loaded to at least one target page in a buffer device in the storage system, release the at least one target page.

In one embodiment of the present invention, the device further comprises an expanding module configured to: in response to receiving an expansion request for expanding a size of the repository, determine an expanded size associated with the expansion request; and update the address mapping based on an address of at least one block in the storage system, here the at least one block is selected from the group and matches the expanded size.

In one embodiment of the present invention, the device further comprises a rebuilding module configured to: in response to a storage device in the storage array being failed, add a backup storage device to the storage array; and recover data from a normal storage device in the storage array to the backup storage device based on the address mapping.

In one embodiment of the present invention, the rebuilding module is further configured to: determine an address range of a target block of the one or more blocks in the storage system based on address mapping; and recover data within the address range from a normal storage device in the storage array to the backup storage device.

In one embodiment of the present invention, the rebuilding module is further configured to: in response to receiving a writing request with respect to the repository, write data to an address range associated with the writing request based on the address mapping; and mar the address range as "used."

In one embodiment of the present invention, the rebuilding module is further configured to: recover data within an address range marked as "used" from a normal storage device in the storage array to the backup storage device.

In one embodiment of the present invention, there is provided a device for managing a storage system. The device comprises: one or more processors; a memory coupled to at least one processor of the one or more processors; computer program instructions stored in the memory which, when executed by the at least one processor, cause the device to execute a method for managing a storage system. The method comprises: dividing a stripe included in a storage array in the storage system into a group of blocks; in response to receiving an allocation request for a storage space in the storage system, determining a space size associated with the allocation request; and building a repository based on one or more blocks selected from the group which match the space size, the repository being defined using an address mapping including address(es) of the one or more blocks in the storage system.

In one embodiment of the present invention, the storage system further comprises a second storage array, and the method further comprises: dividing a stripe in the second storage array into a second group of blocks; and adding the second group of blocks to the group.

In one embodiment of the present invention, the building a repository based on one or more blocks selected from the group which match the space size comprises: selecting the one or more blocks from the group, such that the one or more blocks are uniformly distributed over the storage array and the second storage array.

In one embodiment of the present invention, in response to receiving a reducing request for reducing a size of the repository, a reduced size associated with the reducing request is determined; at least one block matching the reduced size is selected from the one or more blocks; and an address of the at least one block in the storage system is removed from the address mapping.

In one embodiment of the present invention, in response to a target block in the at least one block being loaded to at least one target page in a buffer device in the storage system, the at least one target page is released.

In one embodiment of the present invention, in response to receiving an expansion request for expanding a size of the repository, an expanded size associated with the expansion request is determined; and the address mapping is updated based on an address of at least one block in the storage system, here the at least one block is selected from the group and matches the expanded size.

In one embodiment of the present invention, in response to a storage device in the storage array being failed, a backup storage device is added to the storage array; and data is recovered from a normal storage device in the storage array to the backup storage device based on the address mapping.

In one embodiment of the present invention, the recovering data from a normal storage device in the storage array to the backup storage device comprises: determining an address range of a target block of the one or more blocks in the storage system based on address mapping; and recovering data within the address range from a normal storage device in the storage array to the backup storage device.

In one embodiment of the present invention, in response to receiving a writing request with respect to the repository, data is written to an address range associated with the writing request based on the address mapping; and the address range is marked as "used."

In one embodiment of the present invention, the recovering data from a normal storage device in the storage array to the backup storage device based on the address mapping comprises: recovering data within an address range marked as "used" from a normal storage device in the storage array to the backup storage device.

In one embodiment of the present invention, there is provided a computer program product, tangibly stored on a non-transient computer readable medium and including machine executable instructions which, when being executed, cause the machine to execute steps of the method described above.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:
1. A method for managing a storage system, comprising:
dividing a stripe included in a storage array in the storage system into a first group of blocks;
in response to receiving an allocation request for a storage space in the storage system, determining a space size associated with the allocation request; and
building a repository based on one or more blocks selected from the first group of blocks which match the space size, the repository being defined using an address mapping including addresses of the one or more blocks in the storage system.

2. The method according to claim 1, wherein the storage system further comprises a second storage array, and the method further comprises:
- dividing a stripe in the second storage array into a second group of blocks; and
- adding the second group of blocks to the first group of blocks.

3. The method according to claim 2, wherein the building a repository based on one or more blocks selected from the first group of blocks which match the space size comprises:
- selecting the one or more blocks from the first group of blocks, such that the one or more blocks are uniformly distributed over the storage array and the second storage array.

4. The method according to any of claim 1, further comprising: in response to receiving a reducing request for reducing a size of the repository,
- determining a reduced size associated with the reducing request;
- selecting at least one block matching the reduced size from the one or more blocks; and
- removing an address of the at least one block in the storage system from the address mapping.

5. The method according to claim 4, further comprising: in response to a target block in the at least one block being loaded to at least one target page in a buffer device in the storage system, releasing the at least one target page.

6. The method according to any of claim 1, further comprising: in response to receiving an expansion request for expanding a size of the repository,
- determining an expanded size associated with the expansion request; and
- updating the address mapping based on an address of at least one block in the storage system, which is selected from the first group of blocks and matches the expanded size.

7. The method according to claim 6, further comprising:
- in response to receiving a writing request with respect to the repository, writing data to an address range associated with the writing request based on the address mapping; and
- marking the address range as "used."

8. The method according to claim 7, wherein the recovering data from a normal storage device in the storage array to the backup storage device based on the address mapping comprises:
- recovering data within an address range marked as "used" from a normal storage device in the storage array to the backup storage device.

9. The method according to any of claim 1, further comprising: in response to a storage device in the storage array being failed,
- adding a backup storage device to the storage array; and
- recovering data from a normal storage device in the storage array to the backup storage device based on the address mapping.

10. The method according to claim 9, wherein the recovering data from a normal storage device in the storage array to the backup storage device comprises:
- determining an address range of a target block of the one or more blocks in the storage system based on address mapping; and
- recovering data within the address range from a normal storage device in the storage array to the backup storage device.

11. A device for managing a storage system, comprising:
- one or more processors;
- a memory coupled to at least one processor of the one or more processors;
- computer program instructions stored in the memory which, when executed by the at least one processor, cause the device to execute a method for managing a storage system, the method comprising:
  - dividing a stripe included in a storage array in the storage system into a first group of blocks;
  - in response to receiving an allocation request for a storage space in the storage system, determining a space size associated with the allocation request; and
  - building a repository based on one or more blocks selected from the first group which match the space size, the repository being defined using an address mapping including addresses of the one or more blocks in the storage system.

12. The device according to claim 11, wherein the storage system further comprises a second storage array, and the method further comprises:
- dividing a stripe in the second storage array into a second group of blocks; and
- adding the second group of blocks to the first group of blocks.

13. The device according to claim 12, wherein the building a repository based on one or more blocks selected from the first group of blocks which match the space size comprises:
- selecting the one or more blocks from the first group of blocks, such that the one or more blocks are uniformly distributed over the storage array and the second storage array.

14. The device according to any of claim 11, the method further comprising: in response to receiving a reducing request for reducing a size of the repository,
- determining a reduced size associated with the reducing request;
- selecting at least one block matching the reduced size from the one or more blocks; and
- removing an address of the at least one block in the storage system from the address mapping.

15. The device according to claim 14, the method further comprising:
- in response to a target block in the at least one block being loaded to at least one target page in a buffer device in the storage system, releasing the at least one target page.

16. The device according to any of claim 11, the method further comprising: in response to receiving an expansion request for expanding a size of the repository,
- determining an expanded size associated with the expansion request; and
- updating the address mapping based on an address of at least one block in the storage system, which is selected from the first group of blocks and matches the expanded size.

17. The device according to claim 16, the method further comprising:
- in response to receiving a writing request with respect to the repository, writing data to an address range associated with the writing request based on the address mapping; and
- marking the address range as "used."

18. The device according to claim 17, wherein the recovering data from a normal storage device in the storage array to the backup storage device based on the address mapping comprises:
   recovering data within an address range marked as "used" from a normal storage device in the storage array to the backup storage device.

19. The device according to any of claim 11, the method further comprising: in response to a storage device in the storage array being failed,
   adding a backup storage device to the storage array; and
   recovering data from a normal storage device in the storage array to the backup storage device based on the address mapping.

20. The device according to claim 19, wherein the recovering data from a normal storage device in the storage array to the backup storage device comprises:
   determining an address range of a target block of the one or more blocks in the storage system based on address mapping; and
   recovering data within the address range from a normal storage device in the storage array to the backup storage device.

\* \* \* \* \*